US005923358A

United States Patent [19]

Yamakawa

[11] Patent Number: 5,923,358

[45] Date of Patent: Jul. 13, 1999

[54] LASER PRINTER APPARATUS

[75] Inventor: Hiromitsu Yamakawa, Omiya, Japan

[73] Assignee: Fuji Photo Optical Co., Ltd., Saitama, Japan

[21] Appl. No.: 08/864,129

[22] Filed: May 27, 1997

[30] Foreign Application Priority Data

Jul. 2, 1996 [JP] Japan .................................... 8-191415

[51] Int. Cl.[6] .............................. G01D 15/00; G01D 9/42

[52] U.S. Cl. ............................................ 347/238; 347/241

[58] Field of Search ...................................... 347/238, 241

*Primary Examiner*—N. Le
*Assistant Examiner*—Lamson D. Nguyen
*Attorney, Agent, or Firm*—Snider & Chao; Ronald R. Snider

[57] ABSTRACT

Through an imaging lens, respective luminous fluxes from a semiconductor laser array light source comprising a plurality of semiconductor laser devices arranged in a row form images on a photosensitive surface, thereby effecting light dot formation (light scanning) on a surface to be scanned without using mechanical light-scanning means such as polygon mirror. The laser printer apparatus comprises a semiconductor laser array light source (1) composed of a number of semiconductor laser devices (light-emitting devices; 1*a*) arranged in a row, and an imaging lens (3) for forming images of the luminous fluxes from the respective light-emitting devices (1*a*) in a row on a photosensitive surface (2). The semiconductor laser array light source (1) comprises not less than 700 pieces of minute semiconductor laser devices (1*a*) arranged in a row and is adapted to modulate laser beams from the respective devices (1*a*) independently of each other.

13 Claims, 5 Drawing Sheets

LASER PRINTER APPARATUS

RELATED APPLICATIONS

This application claims the priority of Japanese Patent Application No. 8-191415 filed on Jul. 2, 1996, which is incorporated herein by reference.

BACKGROUND OF THE INVENTION

1. Field of the Invention

The present invention relates to a laser printer apparatus in which a so-called semiconductor laser array comprising a plurality of light-emitting devices arranged in a row is used as a light source, light from the light source is guided onto a surface to be scanned, and a reproduced image is formed on this surface.

2. Description of the Prior Art

In recent years, laser printer apparatus have been employed in various kinds of office machines. Generally used as their light-scanning means are well-known polygon mirrors.

While the polygon mirrors are superior to galvanometer mirrors in terms of high-speed scanning or good shading, they may be problematic, due to fluctuations in surface accuracy or face-tilting amount among mirror faces, in fine curves of scanning lines, fluctuations in scanning pitches, and fluctuations in lengths of scanning lines.

Also, scanning apparatus using such a polygon mirror necessitate a sensor for attaining a timing for scanning in order to make starting points of respective scanning lines coincide with each other.

Further, in the scanning apparatus using such a polygon mirror, vibrations and noises are likely to occur due to the rotating action of their rotary driving section.

Thus, since various problems such as those mentioned above may occur when a polygon mirror is employed as light-scanning means, there has been a demand for developing a technique for scanning a laser beam without using a polygon mirror.

Also, together with such a technique, it becomes necessary to develop an imaging optical system suitable for this technique, which can favorably guide a luminous flux from a laser light source onto the surface to be scanned when such a technique is used.

SUMMARY OF THE INVENTION

In view of the foregoing circumstances, it is an object of the present invention to provide a laser printer apparatus which can scan a laser beam on a surface to be scanned without using any polygon mirror and can favorably guide a luminous flux from a light source onto the surface to be scanned.

The laser printer apparatus in accordance with the present invention comprises a semiconductor laser array light source composed of a plurality of light-emitting devices arranged in a row; an imaging lens for forming on a surface to be scanned an image of each luminous flux emitted from the semiconductor laser array light source; means for modulating, based on a predetermined signal, the individual light-emitting devices of the semiconductor laser array light source independently of each other; and means for relatively moving the surface to be scanned with respect to the imaging lens in a direction orthogonal to a row of dots on the surface to be scanned formed by the respective luminous fluxes from the semiconductor lens array light source.

Preferably, the number of light-emitting devices of the semiconductor laser array light source is not smaller than 700.

Preferably, the light-emitting devices of the semiconductor laser are arranged in a form recessed against the surface to be scanned.

Preferably, the imaging lens is configured so as to become a telecentric system on the semiconductor laser array light source side.

DESCRIPTION OF THE PREFERRED EMBODIMENTS

In the following, embodiments of the present invention will be explained with reference to the accompanying drawings.

Figure 1:
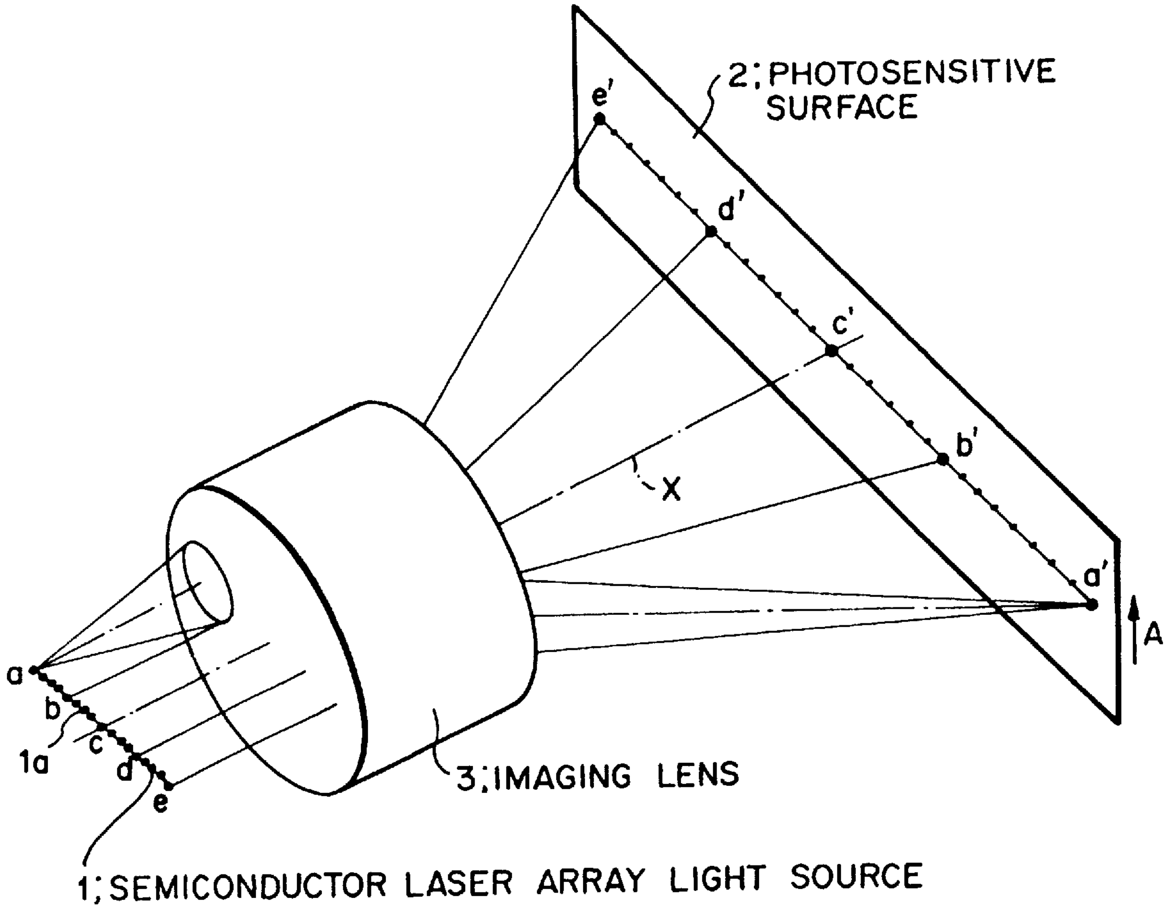
FIG. 1 is a perspective view showing the laser printer apparatus in accordance with an embodiment of the present invention.

FIG. 1 is a conceptual view showing the laser printer apparatus in accordance with an embodiment of the present invention. This laser printer apparatus comprises a semiconductor laser array light source 1 composed of a number of semiconductor laser devices (light-emitting devices) 1*a* arranged in a row; and an imaging lens 3 for forming, in a row on a photosensitive surface 2, images of luminous fluxes from the respective light-emitting devices 1*a*.

The laser array light source 1 comprises not less than 700 pieces of minute semiconductor laser devices 1*a* arranged in a row and can modulate the laser beams from the respective devices 1*a* independently of each other.

The light source 1 comprises not less than 700 pieces of semiconductor laser devices 1*a* in order to irradiate at least the whole one scanning line region of the shorter side of an A6 (postcard-size; 149 mm×105 mm) sheet at once. Namely, since the shorter side of the A6 sheet is set to 105 mm, assuming that printing is effected at 200 dots per inch (25.4 mm), the number of semiconductor laser devices 1*a* to be arranged in a row becomes 200×105/25.4≈827 (pieces). Since printing is usually unnecessary within the area of several mm in each end portion, however, printing can be effected at once in the part corresponding to one scanning line in the shorter side direction of the A6 sheet when not less than 700 pieces of semiconductor laser devices 1*a* are arranged in a row as in the case of this embodiment.

Through the imaging lens 3, the respective luminous fluxes from numerous semiconductor laser devices 1*a* thus arranged in a row form images at predetermined positions on a predetermined line on the photosensitive surface 2, whereby a row of dots (one scanning line) is formed on the photosensitive surface as shown in FIG. 1 upon one shot of simultaneous emission effected by the devices 1*a* in the semiconductor laser array light source 1.

Here, the semiconductor laser is used as the light source 1 since it is remarkably advantageous in terms of light quantity and speed-following characteristics, allowing light scanning to be performed at a higher speed.

There has been proposed a total internal reflection system, in which a gas laser such as He-Ne laser is used as a light source while a number of split luminous fluxes are simultaneously modulated. In such a case, however, the optical system is quite complicated. Also, since it is necessary for a luminous flux from a single laser tube to be divided into several thousand luminous fluxes, a high- output laser tube is required for attaining high-speed light scanning. Further, in this system, the gas laser tube has a large size, thereby increasing the distance between the laser tube and the light modulator. Accordingly, it is difficult for the apparatus to have a compact size, and the cost for making the apparatus is likely to increase.

In this embodiment, by contrast, independently modulated light beams are outputted from the respective semiconductor laser devices, whereby the problems of the prior art such as those mentioned above are overcome.

Also, in this embodiment, as the light emissions of the semiconductor laser array light source 1 are effected at a predetermined timing while the photosensitive surface 2 is subjected to sub-scanning in the direction of arrow A at a predetermined speed, numerous rows of dots corresponding to scanning lines can be formed, allowing a sheet of reproduced image to be formed on the photosensitive surface 2.

As in an embodiment which will be explained later, the imaging lens 3 comprises a lens assembly composed of a plurality of lenses, a lens barrel covering the same, and a stop disposed at a predetermined position therein.

Figure 2:
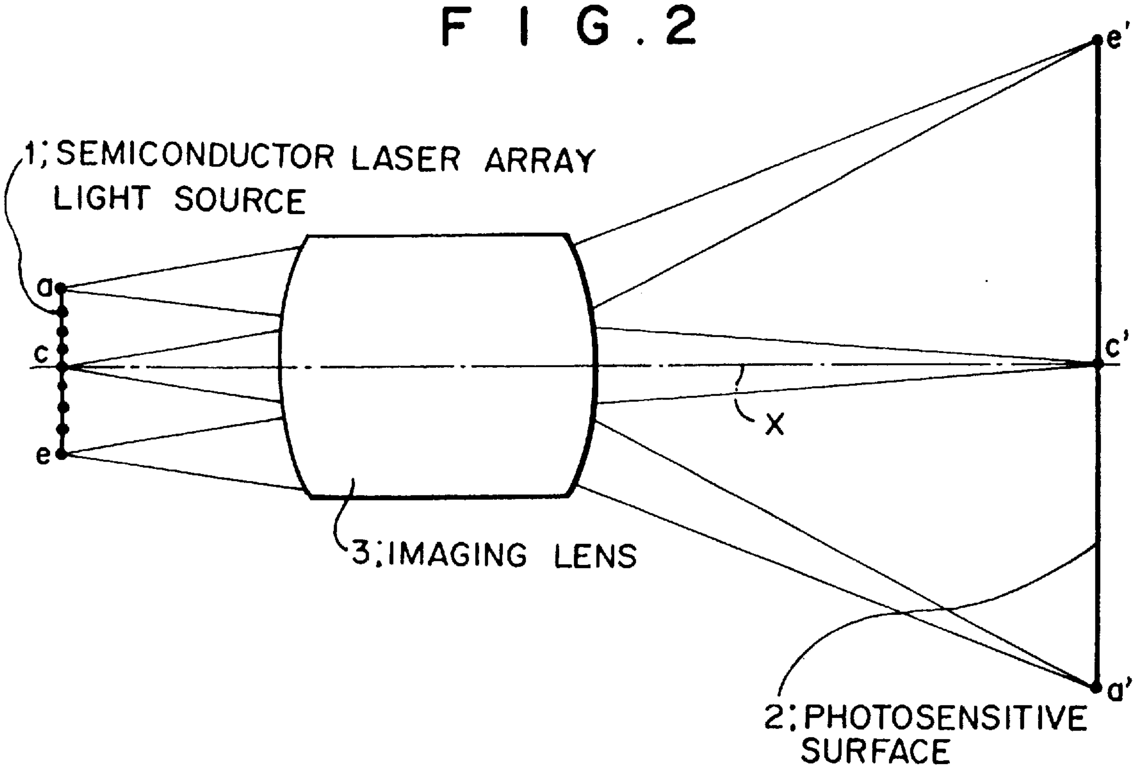
FIG. 2 is a plan view showing the laser printer apparatus in accordance with the above-mentioned embodiment of the present invention.

Also, as shown in FIG. 1 and FIG. 2 which is a plan view of this embodiment, the imaging lens 3 is made telecentric on the side of the semiconductor laser array light source 1. Namely, in the object space of the imaging lens 3, the principal ray emitted from each semiconductor laser device la advances in parallel with the optical axis.

Accordingly, the light quantity of the semiconductor laser light source having a strong directivity can effectively be utilized.

The imaging lens 3 converges luminous fluxes outputted from points a, c, and e in the semiconductor laser array light source 1 onto points a', c', and e' on the photosensitive surface 2, respectively. Namely, the alignment of the points in the semiconductor laser array light source 1 and that of the corresponding points on the photosensitive surface 2 are laterally opposite to each other.

Figure 3:
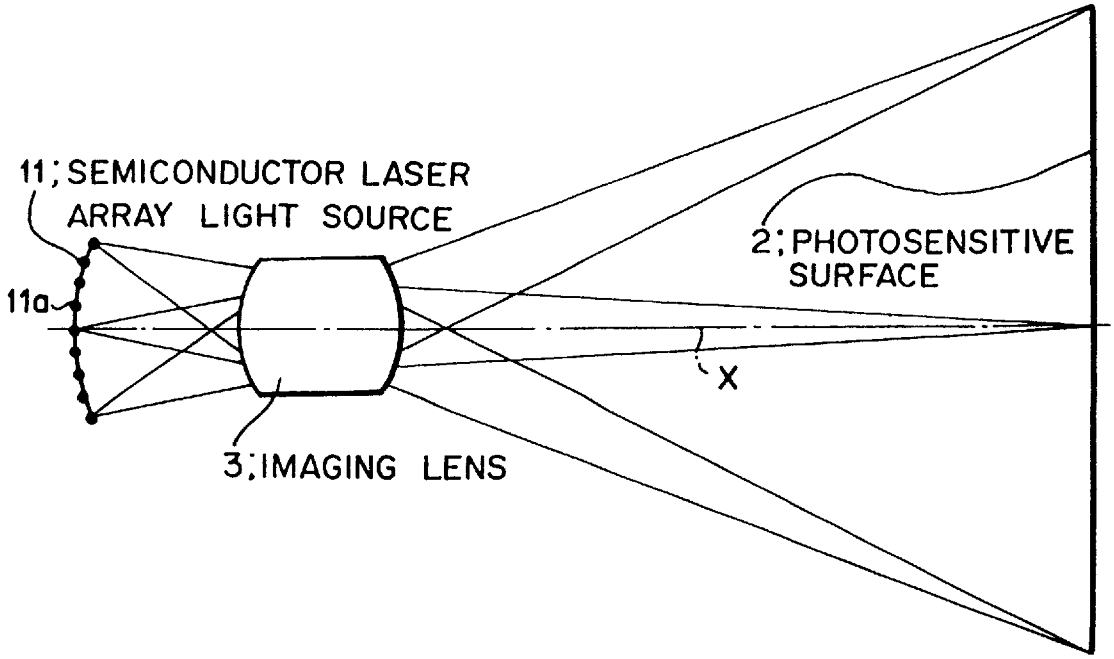
FIG. 3 is a plan view showing the laser printer apparatus in accordance with another embodiment of the present invention.

FIG. 3 is a schematic view showing the optical system of the laser printer apparatus in accordance with another embodiment of the present invention. As in the case of this apparatus, semiconductor laser devices 11*a* of a semiconductor laser array light source 11 can be arranged into a predetermined arc form recessed against an imaging lens 13. With thus arranged semiconductor laser devices 11*a*, each luminous flux from the semiconductor laser array light source 11 having a strong directivity can effectively be guided to the pupil of the imaging lens without employing a telecentric system such as that of the embodiment mentioned above.

Here, similar effects can also be obtained when the semiconductor laser devices of the semiconductor laser array light source are arranged to form a larger angle with the optical axis of the imaging lens in the light-emitting direction as they come closer to both ends of the arrangement, even when they are not arranged in a predetermined arc form recessed against the imaging lens.

Figure 4:
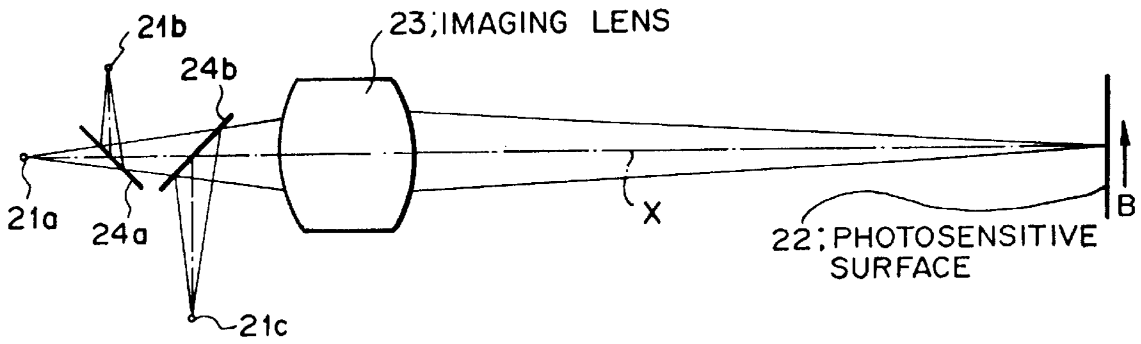
FIG. 4 is a plan view showing the laser printer apparatus in accordance with still another embodiment of the present invention.

FIG. 4 is a view showing the apparatus in accordance with still another embodiment of the present invention (laterally observing its light source), in which a plurality of light sources 21*a*, 21*b*, and 21*c* each comprising semiconductor laser devices 1*a* arranged in a row are used, while luminous fluxes from the light sources 21*a*, 21*b*, and 21*c* are combined together by means of half mirrors or dichroic mirrors 24*a* and 24*b* adapted to transmit or reflect a specific wavelength of light.

In this case, light-emitting wavelengths of the respective light sources 21*a*, 21*b*, and 21*c* are configured so as to correspond to three primary colors exhibited by a photosensitive material, and the luminous fluxes emitted from the corresponding three semiconductor laser devices of the three light sources 21*a*, 21*b*, and 21*c* are made to converge onto a predetermined point of the photosensitive surface 22 while substantially overlapping each other. On the other hand, a photosensitive surface 22 in this case is coated with such a photosensitive material that exhibits a color tone corresponding to the wavelength of color light irradiating it. Accordingly, upon light irradiation effected by the semiconductor laser light array light sources 21*a*, 21*b*, and 21*c* respectively outputting three wavelengths of light different from each other, a desired color image is formed on the photosensitive surface 22.

Also, in the configuration such as that shown in FIG. 4, when the luminous fluxes from the respective laser array light sources 21*a*, 21*b*, and 21*c* are caused to converge onto the photosensitive surface 22 with predetermined minute distances therebetween in a direction orthogonal to the scanning-line extending direction, signals corresponding to three scanning lines can be printed at once, allowing the sub-scanning (in the direction of arrow B) of the photosensitive surface 22 to be performed at a higher speed.

The half mirrors 24*a* and 24*b* shown in FIG. 4 may also be used when a plurality of semiconductor laser array light sources 21*a*, 21*b*, and 21*c* are connected to each other in the alignment direction of the semiconductor laser devices 1*a* in order to increase the number of light-emitting points per line.

Figure 5:
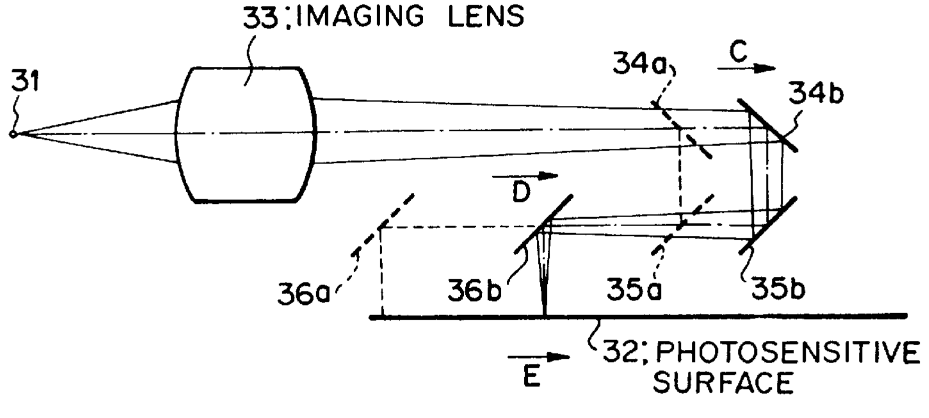
FIG. 5 is a schematic view showing an example of sub-scanning in the laser printer apparatus in accordance with one embodiment of the present invention.

Though the photosensitive surface is moved in the direction of arrow A or B in order to effect sub-scanning in each of the foregoing embodiments, the sub-scanning operation may be effected by movement of a mirror as shown in FIG. 5, for example. FIG. 5 is a view laterally observing a light source 31.

Namely, luminous fluxes from the semiconductor laser array light source 31 are converged by an imaging lens 33 and successively reflected by mirrors 34*b*, 35*b*, 36*b* so as to form images on a photosensitive surface 32. Then, while the distance on the optical axis from the imaging lens 33 and the photosensitive surface 32 is kept constant, the mirrors 34*b* and 35*b* are moved together in the direction of arrow C, and the mirror 36*b* is moved in the direction of arrow D, thereby moving the converging positions of the luminous fluxes on the photosensitive surface 32 in the direction of arrow E.

In FIG. 5, initial positions 34*a*, 35*a*, and 36*a* of the respective mirrors 34*b*, 35*b*, and 36*b*, as well as the initial position of the optical axis, at the time of sub-scanning are indicated by dashed lines.

The operation for sub-scanning light beams based on movement of such mirrors 34*b*, 35*b*, and 36*b* is substantially the same as the technology typically used for readout operations in copying machines.

Without being restricted to the foregoing embodiments, the laser printer apparatus in accordance with the present invention can be modified in various manners, and a variety of functions can be added thereto.

For example, when the efficiency of utilization of light quantity is lower in the center portion than in the peripheral portion on the photosensitive surface, the output of the light-emitting devices of the semiconductor laser light source guided to the peripheral portion may be made greater than the output of the light-emitting devices of the semiconductor laser light source guided to the center portion, thereby homogenizing the light quantity on the photosensitive surface.

In a semiconductor laser, luminous fluxes emitted thereby are likely to have different divergent angles depending on their directions. In such a case, the beam spot form on the photosensitive surface becomes flat when the form of the imaging lens is point-symmetrical with respect to the optical axis. Accordingly, it is preferable that the opening widths of a stop disposed within the imaging lens in the alignment direction of array and in the direction orthogonal thereto be made different from each other, and the powers of the imaging lens in these two directions be made different from each other, so that the imaging magnifications between the light source and the photosensitive surface in the two directions differ from each other, thereby adjusting the beam spot form on the photosensitive surface to a desired shape.

In order for the beam spot form on the photosensitive surface to be changed easily, it is preferable that the size of the stop in the imaging lens be independently variable in the direction of the alignment of light-emitting devices in the semiconductor laser array light source and the direction orthogonal thereto.

Without being restricted to the foregoing embodiments, the number of the light-emitting devices in the semiconductor laser array light source may be, for example, such that only one line of printing can be effected. In this case, since the number of dots forming one side of each character of a font is about 16, for example, about 16 pieces of semiconductor laser array devices may be used so as to correspond to the number of these dots.

Further, the number of devices to be arranged may appropriately be changed according to the aimed use.

While the photosensitive surface is used as a surface to be scanned in the foregoing embodiments, without being restricted thereto, any surfaces can be used as long as a predetermined printing operation can be effected thereon.

In the following, an example of the present invention will be explained in terms of specific values.

EXAMPLE

Figure 6:
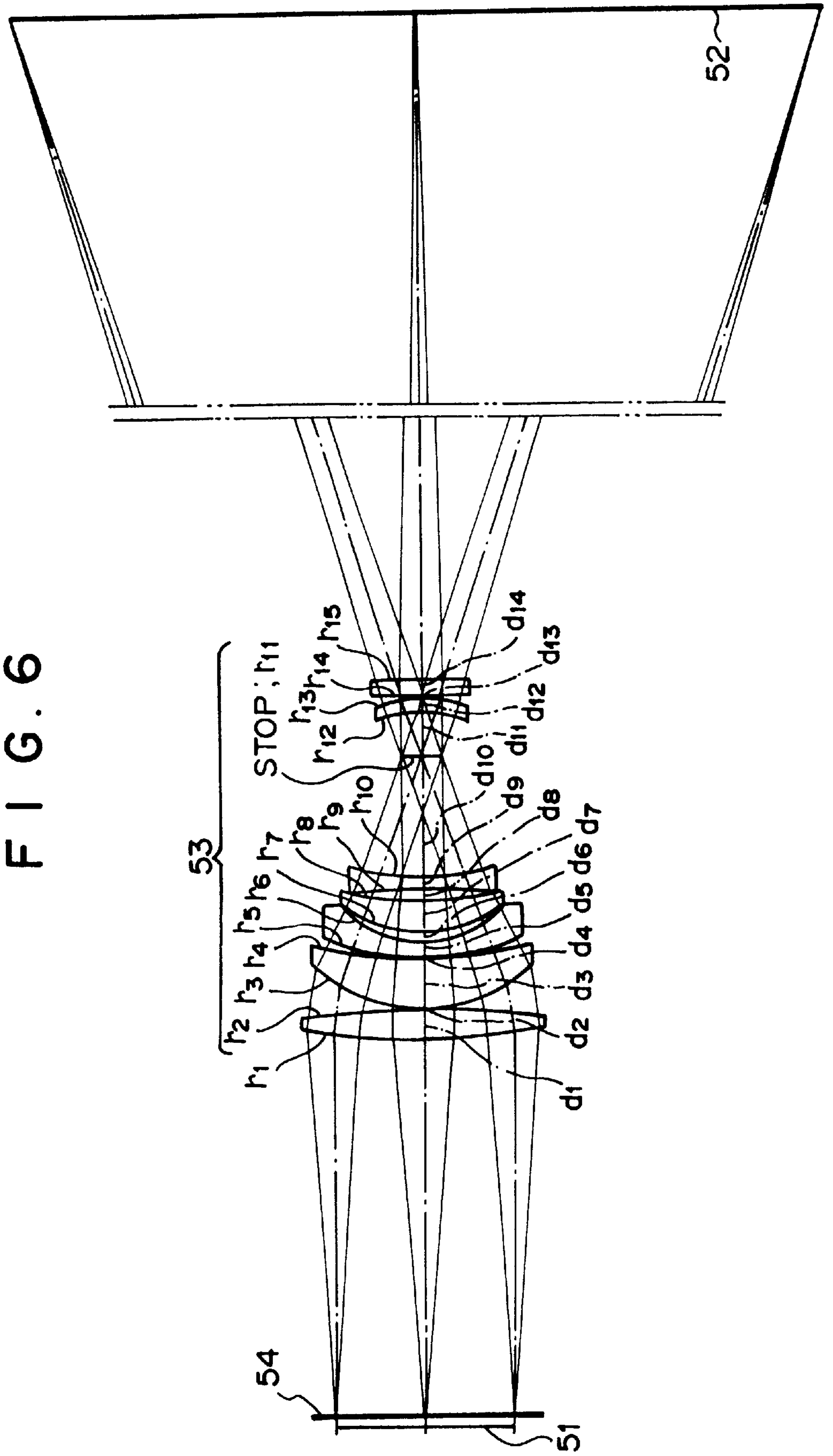
FIG. 6 is a lens configuration view showing the optical system of the laser printer apparatus in accordance with an example of the present invention.

The optical system in this example is configured as shown in FIG. 6 and used for effecting a printing operation with a density of 200 dots per inch (25.4 mm) on the shorter side (210 mm) of an A4- size sheet (297 mm×210 mm). A laser array light source 51 has a light-emitting wavelength of 670 nm and a device pitch of 28 $\mu$m. Accordingly, the number of aligned devices is 200×210/25.4=1,654 pieces, yielding the whole array length of 0.028×1,654=46.31 mm.

In this optical system, between the semiconductor laser array light source 51 and an imaging lens 53, a cover glass 54 having a thickness of 0.7 mm is disposed.

Also, in this optical system, a stop is disposed near the rear-side focal position of a lens assembly constituting first ($r_1$) to tenth ($r_{10}$) lens surfaces, thereby forming a telecentric system on the light source side.

The following Table 1 shows radius of curvature r (mm) of each lens, center thickness of each lens or air gap between neighboring lenses d (mm), and refractive index N of each lens with respect to a light beam having a wavelength of 670 nm in this example.

In Table 1, the numbers (m) denoting the marks r, d, and N successively increase from the side of the semiconductor laser array light source 51.

Also, the lower portion of Table 1 indicates wavelength $\lambda$, as well as focal length f of the whole optical system, imaging magnification $\beta$, and back focus Bf of the lens assembly constituting the first to tenth lens surfaces in the optical system of this example.

Figure 7A:
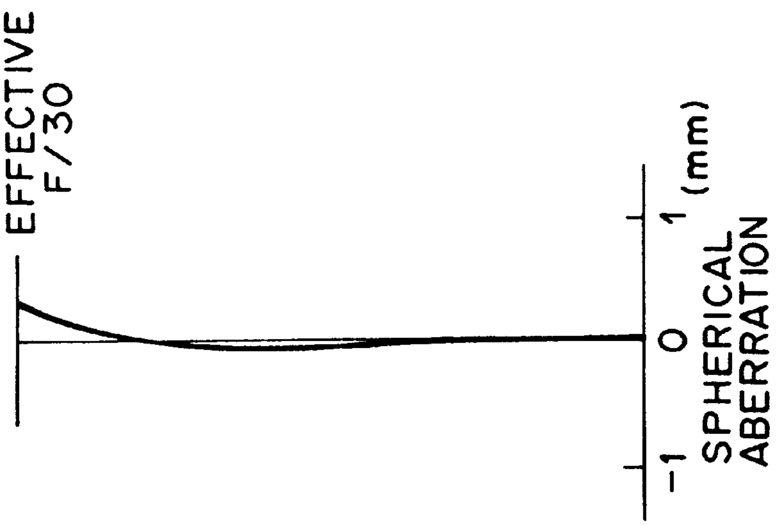
FIGS. 7A, 7B, 7C are aberration charts of the optical system shown in FIG. 6.
Figure 7B:
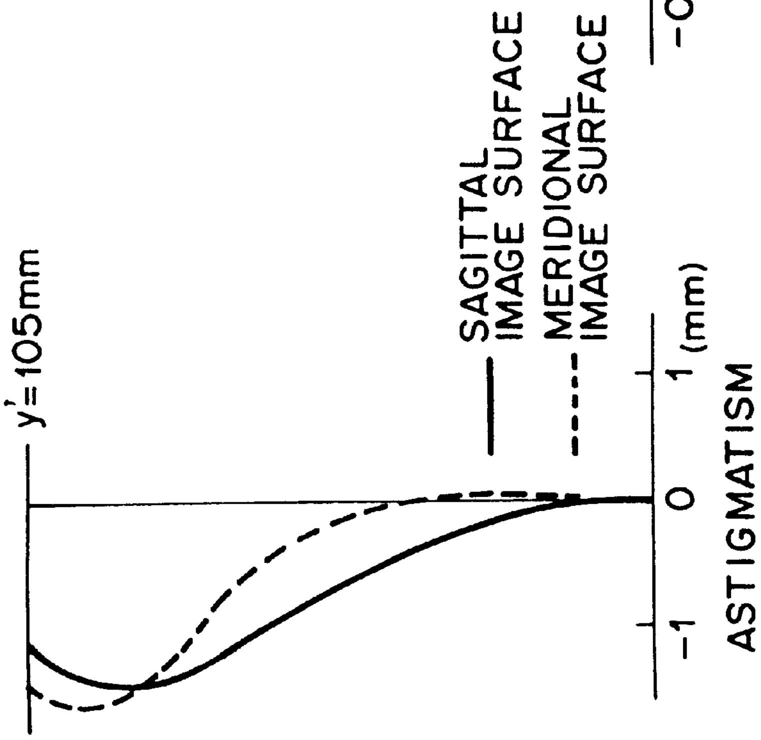
Figure 7C:
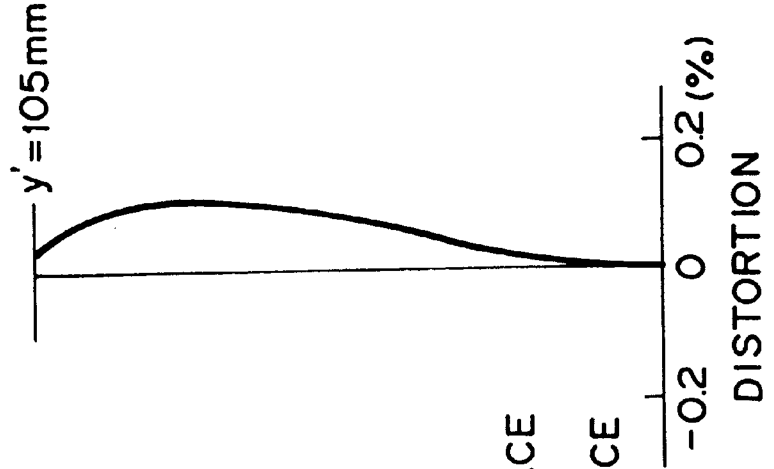

FIG. 7 shows an aberration chart (showing spherical aberration, astigmatism, and distortion). In this aberration chart, y' refers to height.

The spherical aberration chart indicates the aberration with respect to a light beam having a wavelength of 670 nm. The astigmatism chart indicates respective aberrations with respect to sagittal and meridional image surfaces.

As can be seen from FIG. 7, each of the above-mentioned aberrations can be made favorable in accordance with the above-mentioned example.

The present invention may also be adopted so as to obtain an optical apparatus other than the laser printer apparatus. For example, an image readout apparatus for capturing image information may be obtained when an image is disposed on a surface to be scanned, light-emitting devices of a semiconductor laser array light source are lit sequentially or simultaneously so as to irradiate the image, the image is moved in a direction substantially orthogonal to the direction of the row of dots on the surface to be scanned formed by the luminous fluxes from the respective light-emitting devices, and means for receiving the light reflected by the image is provided.

As explained in the foregoing, in accordance with the laser printer apparatus of the present invention, since light scanning is not effected by any mechanical light-scanning means such as polygon mirror, various problems caused by face-tilting of a mirror, such as fluctuations in scanning-line intervals, do not occur. Of course, the sensor for attaining a scanning-line starting timing, which has been required when the conventional polygon mirror is used, is unnecessary.

Also, since there are no parts which move at a high speed, e.g., polygon mirror, vibrations and noises of the whole apparatus can be suppressed to a lower level, allowing the apparatus to have a longer life.

Further, the semiconductor laser devices arranged in a row can simultaneously emit light, whereby printing of one line as a whole can be effected at once, enabling high-speed printing.

TABLE 1

| m | r | d | N |
|---|---|---|---|
| 1 | 179.502 | 7.864 | 1.75224 |
| 2 | −226.678 | 0.295 | |
| 3 | 40.094 | 13.379 | 1.75224 |
| 4 | 109.539 | 0.295 | |
| 5 | 69.719 | 3.932 | 1.59798 |

TABLE 1-continued

| | | | |
|---|---|---|---|
| 6 | 26.075 | 2.762 | |
| 7 | 33.781 | 8.326 | 1.75224 |
| 8 | 93.398 | 2.762 | |
| 9 | −217.496 | 2.752 | 1.59798 |
| 10 | 50.816 | 31.453 | |
| 11 | Stop | 11.889 | |
| 12 | −24.317 | 2.890 | 1.59798 |
| 13 | −31.711 | 0.511 | |
| 14 | 244.264 | 4.443 | 1.75224 |
| 15 | −244.264 | | |
| | Wavelength | $\lambda = 670$ nm | |
| | Focal length | f = 73.57 | |
| | Magnification | $\beta = -4.5357$ | |
| | From 1st to 10th face | Bf = 31.453 | |

What is claimed is:

1. A laser printer apparatus comprising:

a semiconductor laser array light source composed of a plurality of light-emitting devices arranged in a row;

an imaging lens for forming on a surface to be scanned an image of each luminous flux emitted from said semiconductor laser array light source;

means for modulating, based on a predetermined signal, the individual light-emitting devices of said semiconductor laser array light source independently of each other; and means for relatively moving said surface to be scanned with respect to said imaging lens in a direction orthogonal to a row of dots on said surface to be scanned formed by the respective luminous fluxes from said semiconductor laser array light source.

2. A laser printer apparatus according to claim 1, wherein the number of light-emitting devices of said semiconductor laser array light source is not smaller than 700.

3. A laser printer apparatus according to claim 1, wherein said imaging lens is configured a telecentric system on the semiconductor laser array light source side.

4. A laser printer apparatus according to claim 1, wherein said imaging lens includes a stop whose widths in a direction corresponding to the row of the light-emitting devices arranged in said semiconductor laser array light source and in a direction orthogonal to said corresponding direction are different from each other.

5. A laser printer apparatus according to claim 1, wherein said imaging lens includes a stop whose widths in a direction corresponding to the row of the light-emitting devices arranged in said semiconductor laser array light source and in a direction orthogonal to said corresponding direction are adjustable independently of each other.

6. A laser printer apparatus according to claim 1, wherein a plurality of rows of the light-emitting devices of said semiconductor laser array light source are arranged in a direction orthogonal to each row of the light-emitting devices arranged in said semiconductor laser array light source.

7. A laser printer apparatus according to claim 1, wherein, in said semiconductor laser array light source, light-emitting devices located in regions respectively closer to both end portions than a center portion have a higher output.

8. A laser printer apparatus according to claim 1, wherein said imaging lens has powers in a direction corresponding to the row of the light-emitting devices arranged in said semiconductor laser array light source and in a direction orthogonal to said corresponding direction different from each other.

9. A laser printer apparatus according to claim 1, wherein the light-emitting devices of said semiconductor laser are arranged in a curve recessed against said imaging lens.

10. A laser printer apparatus according to claim 1, wherein a plurality of luminous fluxes from said semiconductor laser array light source are guided onto said surface to be scanned to attain an increased width of printing.

11. A laser printer apparatus according to claim 1, wherein a plurality of luminous fluxes from said semiconductor laser array light source are guided to form images on said surface to be scanned with predetermined distances therebetween in a direction substantially orthogonal to rows of dots formed by the respective luminous fluxes from said semiconductor laser array light sources.

12. A laser printer apparatus according to claim 1, wherein a plurality of luminous fluxes from said semiconductor laser array light source respectively having output light wavelengths different from each other are guided onto a photosensitive surface which exhibits colors different from each other for the respective wavelengths of irradiation light so as to reproduce a color image on said photosensitive surface.

13. A laser printer apparatus comprising:

a semiconductor laser array light source composed of a plurality of light-emitting devices arranged in a row;

an imaging lens for forming on a surface to be scanned an image of each luminous flux emitted from said semiconductor laser array light source;

means for modulating, based on a predetermined signal, the individual light-emitting devices of said semiconductor laser array light source independently of each other; and means for relatively moving said surface to be scanned with respect to said imaging lens in a direction orthogonal to the row of light-emitting devices.

* * * * *